(12) United States Patent
Bennett

(10) Patent No.: US 11,374,645 B1
(45) Date of Patent: Jun. 28, 2022

(54) COMMUNICATING POLARIZATION-DEPENDENT INFORMATION OVER A FREE SPACE CHANNEL

(71) Applicant: Emeric S. Bennett, Chardon, OH (US)

(72) Inventor: Emeric S. Bennett, Chardon, OH (US)

(*) Notice: Subject to any disclaimer, the term of this patent is extended or adjusted under 35 U.S.C. 154(b) by 0 days.

(21) Appl. No.: 17/584,618

(22) Filed: Jan. 26, 2022

(51) Int. Cl.
*H04B 7/10* (2017.01)
*H04L 5/04* (2006.01)
*H04L 5/00* (2006.01)

(52) U.S. Cl.
CPC ............ *H04B 7/10* (2013.01); *H04L 5/0098* (2013.01); *H04L 5/04* (2013.01)

(58) Field of Classification Search
CPC ............ H04B 7/10; H04L 5/0098; H04L 5/04
See application file for complete search history.

(56) References Cited

U.S. PATENT DOCUMENTS

| | | | |
|---|---|---|---|
| 4,512,024 A | 4/1985 | Gutleber | |
| 7,684,506 B2 * | 3/2010 | Murakami | H04L 1/0618 375/267 |
| 10,630,510 B2 * | 4/2020 | Pratt | H04L 25/022 |
| 2021/0135911 A1 * | 5/2021 | Feher | H04N 21/426 |

FOREIGN PATENT DOCUMENTS

| | | | | |
|---|---|---|---|---|
| BR | PI0707532 A2 | * | 5/2011 | |
| CN | 108616476 A | * | 10/2018 | ....... H04L 25/03159 |
| JP | 4322268 B2 | * | 8/2009 | ............ H03D 7/161 |
| JP | WO2013115016 A1 | * | 5/2015 | |

* cited by examiner

*Primary Examiner* — Jean B Corrielus
(74) *Attorney, Agent, or Firm* — Renner, Otto, Boisselle & Sklar, LLP

(57) ABSTRACT

Communicating polarization-dependent information over a free space channel may include separating a data signal carrying data into a first signal and a second signal each carrying a portion of the data of the data signal, modulating a first carrier signal with the first signal and a second carrier signal with the second signal, radiating the modulated first signal with a first polarization as a polarized first signal over a free space channel, radiating the modulated second signal with a second polarization as a polarized second signal over the free space channel, demodulating the polarized first signal and the polarized second signal, and combining the demodulated first signal with the demodulated second signal to provide an output signal carrying the data of the data signal.

37 Claims, 9 Drawing Sheets

COMMUNICATING POLARIZATION-DEPENDENT INFORMATION OVER A FREE SPACE CHANNEL

BACKGROUND

As is well known, the Shannon-Hartley theorem is a foundational theorem of information theory. The Shannon-Hartley theorem addresses the maximum rate at which information can be transmitted over a communications channel based on a bandwidth of the channel and a signal-to-noise ratio (SNR) over the bandwidth (i.e., $C = B \log_2(1+S/N)$, where C is channel capacity, B is the bandwidth of the channel, S is signal power, and N is noise power (i.e., S/N is the SNR).

As such, according to the Shannon-Hartley theorem, an increase in channel capacity must be accompanied with an increase in either the bandwidth or the SNR. Conventional methods of increasing channel capacity have attempted to use bandwidth and/or SNR, however, bandwidth is becoming increasingly limited and attempts to increase the SNR have also proven difficult.

SUMMARY

Communicating polarization-dependent information may include separating a data signal carrying data into two signals with each of the signals holding a portion of the data. Modulation techniques may be applied to transmit the signals over a free space channel where each of the signals has a polarization that is orthogonal to one another. This allows both of the signals to radiate over the free space channel in the same frequency spectrum without interfering with one another. As such, the capacity of the channel may be increased without resorting to increasing the bandwidth or the SNR and more information may be communicated over the free space channel compared to conventional methods.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

The techniques presented herein may communicate a data stream through free space with differently polarized electromagnetic radiation over a free space channel. Key parts include separating the data stream into a first portion and a second portion and communicating the first portion of the data stream with electromagnetic radiation having a first polarization and communicating the second portion of the data stream with electromagnetic radiation having a second polarization different than the first polarization over the free space channel.

Once this is accomplished, the first portion of the data stream communicated with the electromagnetic radiation having the first polarization and the second portion of the data stream communicated with the electromagnetic radiation having the second polarization may be communicated over the free space channel without interfering with one another and with the bandwidth occupied by the spectrum of the transmitted free space RF signal being less than the bandwidth required by conventional modulation techniques. (i.e., a bandwidth of the first portion of the data stream communicated with the electromagnetic radiation having the first polarization plus the bandwidth of the second portion of the data stream communicated with the electromagnetic radiation having the second polarization together greater than the transmitted RF bandwidth.

Data contained in the first portion of the data stream communicated with the electromagnetic radiation having the first polarization and data contained in the second portion of the data stream communicated with the electromagnetic radiation having the second polarization may be extracted and recombined to output the data stream.

Figure 1:
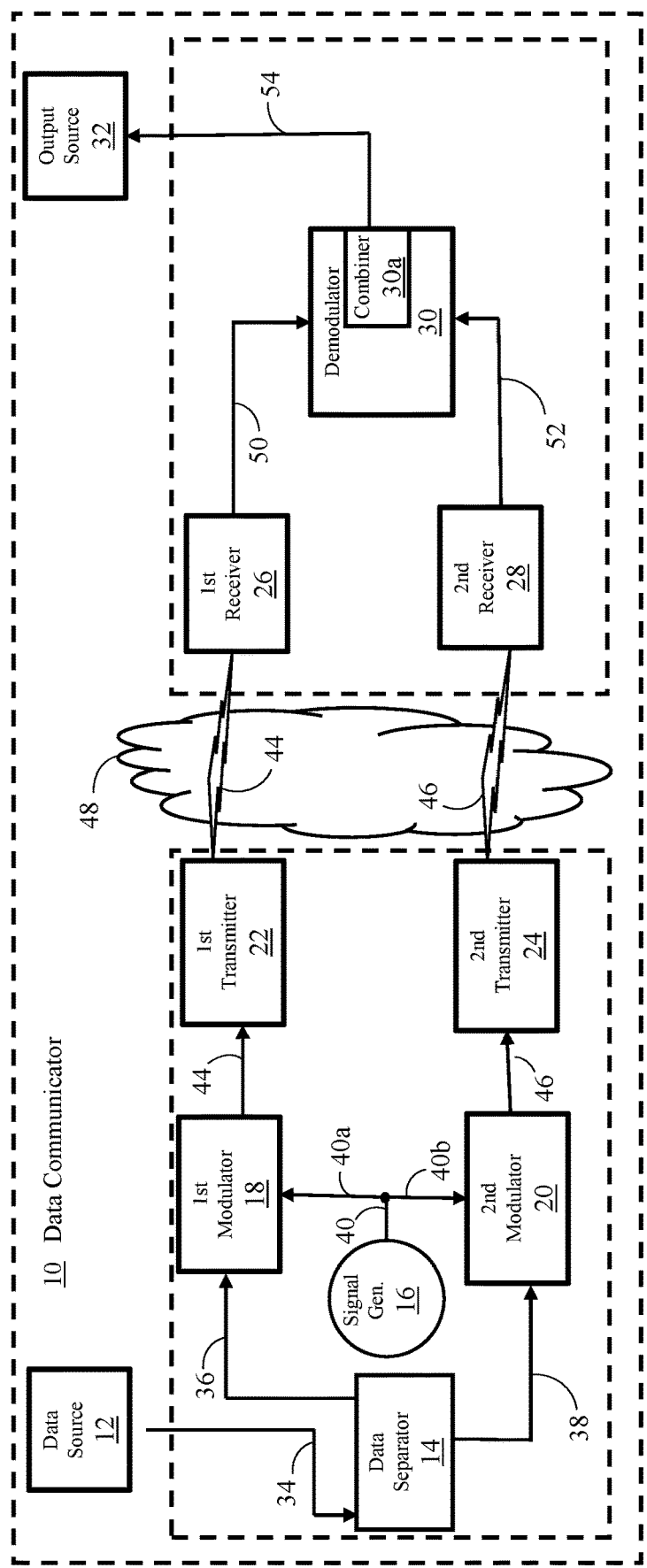
FIG. 1 illustrates a block diagram of an exemplary embodiment of a data communicator for communicating a data stream through free space with differently polarized electromagnetic radiation over a free space channel.

FIG. 1 illustrates a block diagram of an exemplary embodiment of a data communicator 10 for communicating a data stream through free space with differently polarized electromagnetic radiation over a free space channel. To increase an amount of data of a data stream communicated over a free space channel, the data communicator 10 may communicate portions of the data of the data stream with different polarizations over the free space channel.

In the example of FIG. 1, the data communicator 10 may receive a data signal including a data stream, separate the data stream into a first data stream carrying an initial portion of the data stream and a second data stream carrying the remaining portion of the data stream, modulate the first data stream onto a first radio frequency (RF) signal, modulate the second data stream onto a second radio frequency (RF) signal, communicate the first RF signal with a first polarization, communicate the second RF signal with a second polarization, extract the initial portion of the data stream from the first RF signal having the first polarization, extract the remaining portion of the data stream from the second RF signal having the second polarization, and recombine the initial portion of the data stream and the remaining portion of the data stream into an output data stream. While the electromagnetic radiation described in the example of FIG. 1 is RF radiation, the techniques described herein may be applied to any suitable electromagnetic radiation.

The data communicator 10 may include a data source 12, a data separator 14, a signal generator 16, a first modulator 18, a second modulator 20, a first transmitter 22, a second transmitter 24, a first receiver 26, a second receiver 28, a demodulator 30, and an output source 32.

The data source 12 may provide an input signal 34 carrying a data stream having a first bandwidth to the data separator 14. The data separator 14 may separate the input signal 34 into a first signal 36 carrying a first portion of data of the data stream having a second bandwidth and a second signal 38 carrying a second portion of data of the data stream having a third bandwidth. The first bandwidth of the input signal 34 may be greater than each of the second bandwidth of the first signal 36 and the third bandwidth of the second signal 38. In some implementations, the first portion of data of the data stream may be an initial portion and the second portion of data of the data stream may be a remaining portion such that the entire data stream is communicated by, at least in part, the first signal 36 and the second signal 38.

The signal generator 16 may generate an RF carrier signal 40 which may be fed to the first modulator 18 and the second modulator 20 as a first RF carrier signal 40a and a second RF carrier signal 40b, respectively. However, the first RF carrier signal 40a and the second RF carrier signal 40b may be the same or different signals.

The first RF carrier signal 40a may be fed as an input to the first modulator 18 and the second RF carrier signal 40b may be fed as an input to the second modulator 20. The first modulator 18 may modulate the first signal 36 onto the first RF carrier signal 40a and output a modulated first RF signal 44. The second modulator 20 may modulate the second signal 38 onto the second RF carrier signal 40b and output a modulated second RF signal 46.

The modulated first RF signal 44 may be fed as an input to the first transmitter 22 and the modulated second RF signal 46 may be fed as an input to the second transmitter 24. The first transmitter 22 may transmit the modulated first RF signal 44 with a first polarization over a free space channel 48. The second transmitter 24 may transmit the modulated second RF signal 46 with a second polarization that is different than the first polarization through the free space channel 48. In some implementations, the first polarization may be horizontal and the second polarization may be vertical, however, the first polarization and the second polarization may be any suitable polarizations.

The first receiver 26 may receive the transmitted modulated first RF signal 44 having the first polarization and output a received modulated first RF signal 50. The second receiver 28 may receive the transmitted modulated second RF signal 46 having the second polarization and output a received modulated second RF signal 52. In some implementations, the first receiver 26 may be horizontally polarized and the second receiver 28 may be vertically polarized, however, the first receiver 26 and the second receiver 28 may be polarized in any suitable manner.

The received modulated first RF signal 50 and the received modulated second RF signal 52 may be fed as inputs to the demodulator 30. The demodulator 30 may demodulate the received modulated first RF signal 50 and the received modulated second RF signal 52 to extract the first portion of data of the data stream from the received modulated first RF signal 50 and the second portion of data of the data stream from the received modulated second RF signal 52. The demodulator 30 may include a combiner 30a that combines the first portion of data of the data stream extracted from the received modulated first RF signal 50 and the second portion of the data of the data stream extracted from the received modulated second RF signal 52 to output an output signal 54 carrying the data stream that was contained in the input signal 34. The output signal 54 may be fed as an input to the output source 32.

As such, one exemplary benefit of the data communicator 10 described in FIG. 1 is an increase in a channel capacity of the free space channel 48 based, at least in part, on communicating portions of the data stream with different polarizations such that there is no interference between the communicated portions and no increase in the total bandwidth needed to communicate the data through the free space channel 48.

Figure 2:
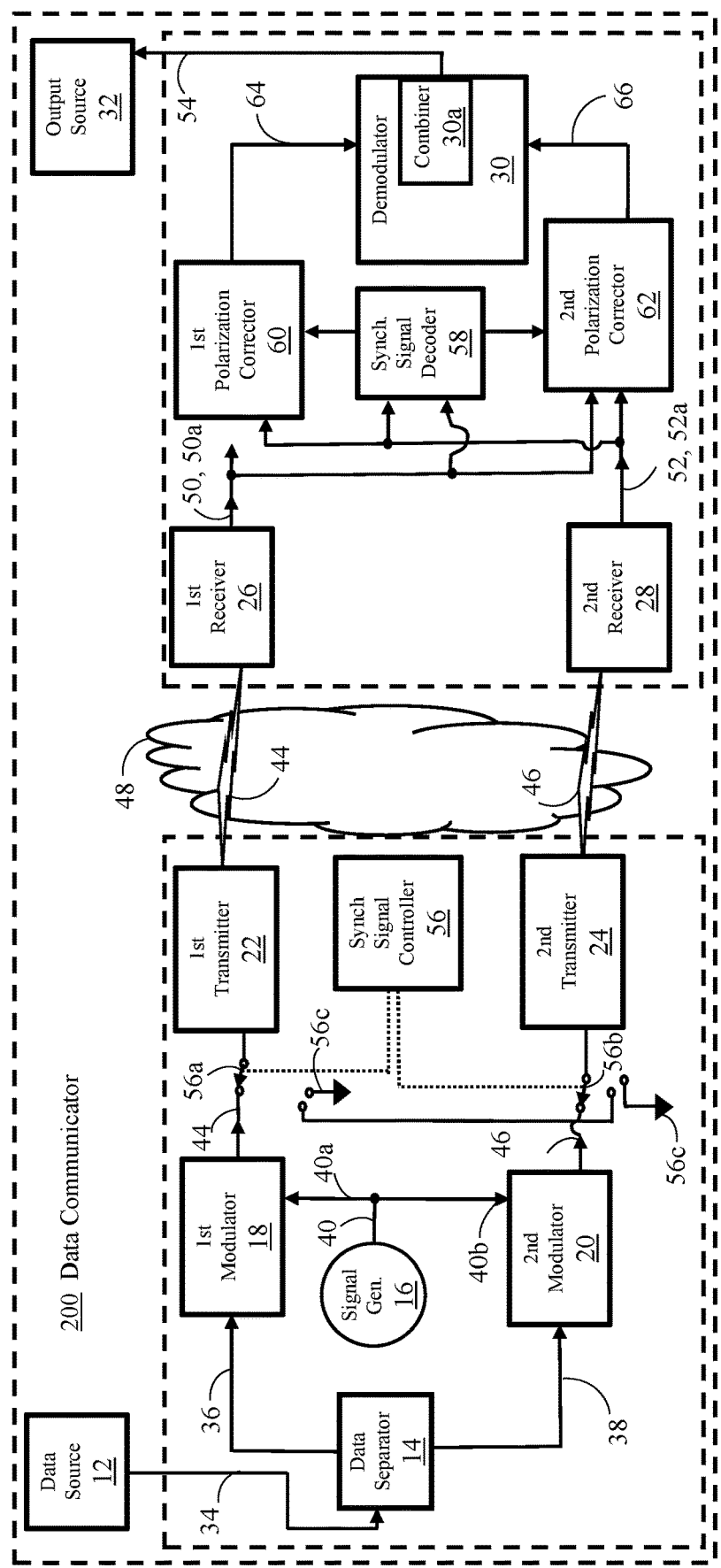
FIG. 2 illustrates a block diagram of another exemplary embodiment of a data communicator for communicating a data stream through free space with differently polarized electromagnetic radiation over a free space channel.

FIG. 2 illustrates a block diagram of another exemplary embodiment of a data communicator 200 for communicating a data stream through free space with differently polarized electromagnetic radiation over a free space channel. The data communicator 200 of FIG. 2 is substantially identical to the data communicator 10 of FIG. 1, with a few exceptions/ changes as further described below.

More particularly, the data communicator 200 may include a synchronization signal controller 56, a synchronization signal decoder 58, a first polarization corrector 60, and a second polarization corrector 62. The synchronization signal controller 56 may be in operative communication with a first switch 56a and a second switch 56b.

In some implementations, the polarization of the first transmitter 22 may not match the polarization of the first receiver 26 and/or the polarization of the second transmitter 24 may not match the polarization of the second receiver 28. The received modulated first RF signal 50 may carry both a first signal portion transmitted by the first transmitter 22 and a second signal portion transmitted by the second transmitter 24 mixed together in unequal portions. The received modulated second RF signal 52 may carry both the first signal portion transmitted by transmitter 22 and the second signal portion transmitted by the second transmitter 24 mixed together in unequal portions different from the received modulated first RF signal 50.

In these scenarios, axis rotation may be utilized to correct the spatial polarization mismatch of the transmitted modulated first RF signal 44 and the transmitted modulated second RF signal 46 with the first receiver 26 and second receiver 28, respectively. For example, the received modulated first RF signal 50 and the received modulated second RF signal 52 may be corrected, via the first polarization corrector 60 and the second polarization corrector 62, such that a corrected modulated first RF signal 64 and a corrected modulated second RF signal 66 each represents only one, or substantially one, type of polarization before being fed as an input to the demodulator 30.

Stated otherwise, the corrected modulated first RF signal 64 may include the first signal portion of the received modulated first RF signal 50 and at least a part of the second signal portion of the received modulated second RF signal 52 and the corrected modulated second RF signal 66 may include at least a part of the second signal portion of the received modulated first RF signal 50 and the first signal portion of the received modulated second RF signal 52.

One exemplary method of synchronization may include periodically transmitting synchronizing signals, which may be the first RF carrier signal 40*a* and the second RF carrier signal 40*b*. The first RF carrier signal 40*a* and the second RF carrier signal 40*b* may be transmitted by the first transmitter 22 and the second transmitter 24, respectively. The first receiver 26 may receive the transmitted first RF carrier signal 40*a* and output a received unmodulated first RF signal 50*a*. The second receiver 28 may receive the transmitted second RF carrier 40*b* and output a received unmodulated second RF signal 52*a*. The received unmodulated first RF signal 50*a* and the received unmodulated second RF signal 52*a* may be received as inputs to the synchronization signal decoder 58.

The synchronization signal decoder 58 may recognize the synchronization signals and may develop polarization correction factors. The polarization correction factors may be inputs to the first polarization corrector 60 and the second polarization corrector 62. The first polarization corrector 60 may utilize the polarization correction factors to correct the received modulated first RF signal 50 to account for portions of the transmitted modulated second RF signal 46 received by the first receiver 26 leaving only, or substantially only, the correct transmitted modulated first RF signal 44 in the corrected modulated first RF signal 64. The second polarization corrector 62 may utilize the polarization correction factors to correct the received modulated second RF signal 52 to account for portions of the transmitted RF signal 44 received by the second receiver 28 leaving only, or substantially only, the transmitted modulated second RF signal 46 in the corrected modulated second RF signal 66.

To allow polarization corrections to be made, synchronization signals may be transmitted. The synchronization signal controller 56 may switch the first switch 56*a* and the second switch 56*b* causing each of the first switch 56*a* and the second switch 56*b* to connect to ground contacts 56*c*, which, in turn, interrupts the transmission of the modulated first RF signal 44 and the modulated second RF signal 46. The synchronization signal decoder 58 may interpret such an interrupt in the transmission as an RF synchronization signal indicating to the synchronization signal decoder 58 that the information immediately following the interrupt is to be used for synchronization, for generating the correction factors described above.

After a predetermined period of time, the synchronization signal controller 56 may switch the first switch 56*a* to move the first switch 56*a* from the ground contact 56*c* to a point where the first switch 56*a* is in operable communication with the signal generator 16 while the second switch 56*b* stays connected to ground contact 56*c*. This causes the first transmitter 22 to transmit the first RF carrier signal 40*a*, which may be an unmodulated horizontally polarized free space RF reference signal at a maximum amplitude and a reference phase (i.e., a zero-degree phase), while the second transmitter 24 may transmit no signal. If the orientation of the first receiver 26 and second receiver 28 match the orientation of the first transmitter 22 and the second transmitter 24, then the first receiver 26 may receive the first synchronization signal (e.g., the first RF carrier signal 40*a*) and the second receiver 28 may receive no signal.

If the orientation of the first receiver 26 and second receiver 28 do not match the orientation of the first transmitter 22 and the second transmitter 24, then each of the first receiver 26 and second receiver 28 may receive a portion of the first synchronization signal transmitted by the first transmitter 22. The output of the first receiver 26 (e.g., the received unmodulated first RF signal 50*a*), and the output of the second receiver 28 (e.g., the received unmodulated second RF signal 52*a*) may be fed to the synchronization signal decoder 58. In cases where the first transmitter 22 and the second transmitter 24 are aligned with the first receiver 26 and the second receiver 28, the output of the second receiver 28 may be no signal.

The synchronization signal decoder 58 may determine if RF polarization correction is needed. If RF polarization correction is not needed, the synchronization signal decoder 58 may provide the first polarization corrector 60 and the second polarization corrector 62 no polarization correction factors or polarization correction factors that cause the first polarization corrector 60 and the second polarization corrector 62 to receive and output RF signals without affecting the signals.

If RF polarization correction is needed, the synchronization signal decoder 58 may compute polarization correction factors for use by the first polarization corrector 60 and the second polarization corrector 62. The synchronization signal decoder 58 may store the polarization correction factors and may provide the polarization correction factors to the first polarization corrector 60 and the second polarization corrector 62 continuously until another synchronization signal is detected.

When the next RF synchronization signal is detected by the synchronization signal decoder 58, new polarization correction factors may be computed to replace the previously stored polarization correction factors.

In another example, a second synchronization signal may be transmitted after the first synchronization signal. In this scenario, after transmitting the first synchronization signal for a predetermined period of time, the second synchronization signal (e.g., the second RF carrier signal 40*b*) may be transmitted when the synchronization signal controller 56 switches the first switch 56*a* to connect to ground contact 56*c* and switches the second switch 56*b* from the ground contact 56*c* to a point where the second switch 56*b* is in operable communication with the signal generator 16.

This causes the second transmitter 24 to transmit the second synchronization signal, (e.g., the second RF carrier signal 40*b*), which may be an unmodulated vertically polarized free space RF reference signal at a maximum amplitude and a reference phase (i.e., a zero-degree phase), while the first transmitter 22 may transmit no signal. This second synchronization signal may be received by the receiver 28 and processed in a substantially similar manner as the first synchronization signal except that the polarization correction factors determined by the synchronization signal decoder 58 may be based on the first synchronization signal and the second synchronization signal.

After transmitting the first synchronization signal (and the second synchronization signal, if transmitted) for an amount of time sufficient for the synchronization signal decoder 58 to develop the polarization correction factors, the synchronization controller 56 may end transmission of the first synchronization signal (and the second synchronization signal, if transmitted) by causing the switches 56*a* and 56*b* to connect the modulated first RF signal 44 to the first transmitter 22 and to connect the modulated second RF signal 46 to the second transmitter 24 thereby recommencing the data transmission.

As stated above, the received modulated first RF signal 50 and the received modulated second RF signal 52 may be fed as inputs to the first polarization corrector 60 and the second polarization corrector 62. The first polarization corrector 60 and the second polarization corrector 62 may correct, via polarization correction factors computed based on the synchronization signal(s), the received modulated first RF signal 50 and the received modulated second RF signal 52 to produce the corrected modulated first RF signal 64 and the corrected modulated second RF signal 66.

The horizontally polarized signal components of the corrected modulated first RF signal 64 may be maximized while the vertically polarized signal components of the corrected modulated first RF signal 64 may be minimized. The vertically polarized signal components of the corrected modulated second RF signal 66 may be maximized while the horizontally polarized signal components of the corrected modulated second RF signal 66 may be minimized. The corrected modulated first RF signal 64 and the corrected modulated second RF signal 66 may be fed as inputs to the demodulator 30.

Stated otherwise, the first polarization corrector 60 and the second polarization corrector 62 may be configured to correct the received modulated first RF signal 50 and the received modulated second RF signal 52, based on the reception of one or more synchronization signals with known characteristics, as described above, to produce the corrected modulated first RF signal 64 and the corrected modulated second RF signal 66. The corrected modulated first RF signal 64 may include the first signal portion of the received modulated first RF signal 50 and at least a part of the second signal portion of the received modulated second RF signal 52 (e.g., a minimal portion) while the corrected modulated second RF signal 66 may include at least a part of the second signal portion of the received modulated first RF signal 50 and the first signal portion of the received modulated second RF signal 52 (e.g., a minimal portion).

In another example, a periodically recurring data sequence may be used as the synchronization signal. For example, the Hypertext Transfer Protocol (HTTP) specifies that data may be sent in data packets, and each data packet may start with the same defined sequence. This defined sequence may be used by the synchronization signal decoder 58 as the synchronization signal. If no suitable data sequence exists in the data stream to be communicated, a synchronization sequence can be added to the data stream periodically.

For example, the synchronization signal may be used as a start bit and a stop bit with the received modulated first RF signal 50 to determine whether any errors in the transmission have occurred. The portion of the synchronization signal when there is no carrier signal transmitted may be regarded as the stop bit and the portion of the synchronization signal where the horizontal reference signal, or vertical reference signal, if present, is transmitted is regarded as the start bit.

The synchronization signal decoder 58 may receive the transmitted start bit, the stop bit, the received modulated first RF signal 50 and the received modulated second RF signal 52 to determine if there are any transmission errors. In the event transmission errors are detected, the data associated with the received modulated first RF signal 50 and the received modulated second RF signal 52 may be transmitted again and/or any other suitable actions may be taken to correct the errors.

As another example, the synchronization signal may be periodically sent as a timing signal generated from an external clock to ensure the transmitters (e.g., 22 and 24) and the receivers (e.g., 26 and 28) are synchronized with one another. Error detection techniques may be utilized to determine whether transmission errors occur, such as, for example, using an error-detecting code that is checked by the transmission side and the receive side of the data communicator 200. If errors are detected, the data associated with the received modulated first RF signal 50 and the received modulated second RF signal 52 may be transmitted again and/or any other suitable actions may be taken to correct the errors.

Figure 3:
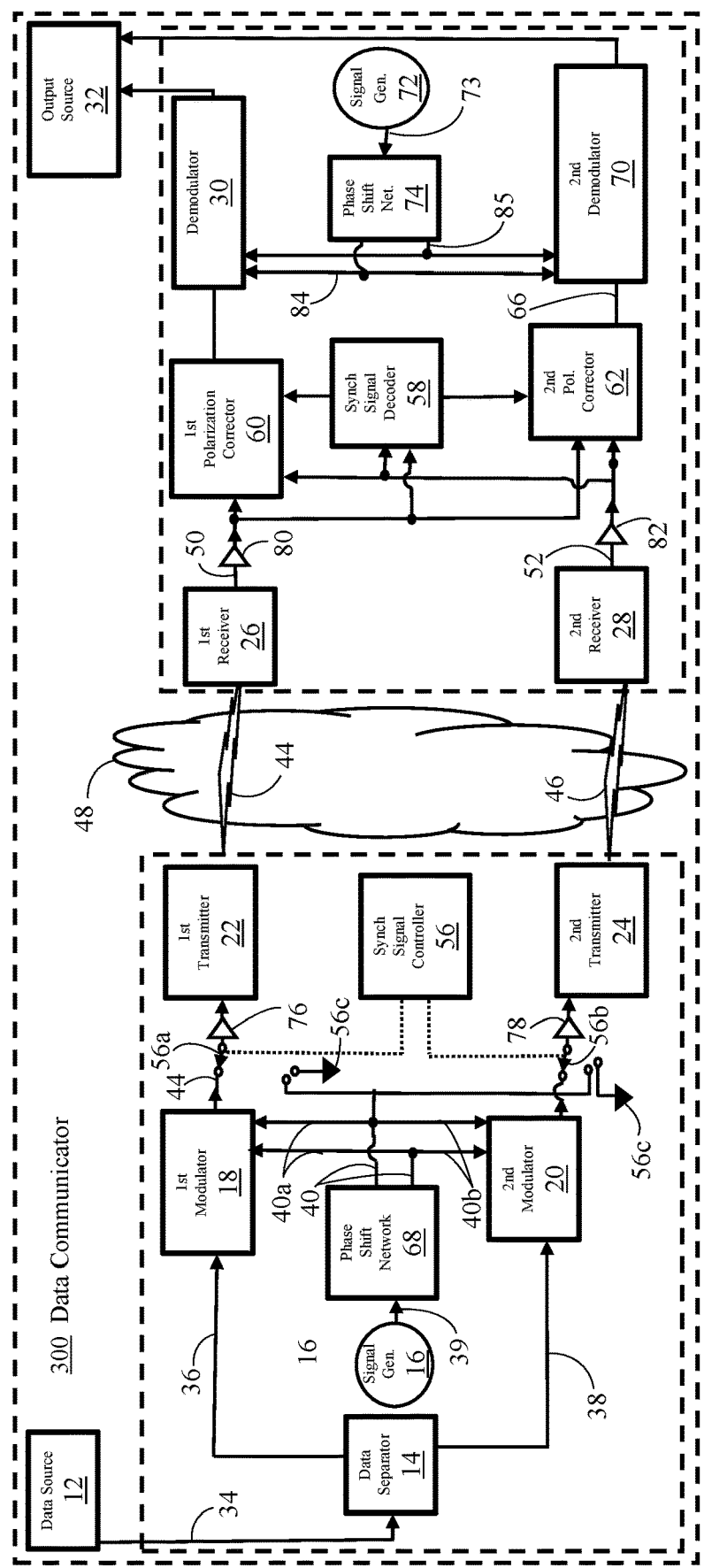
FIG. 3 illustrates a block diagram of another exemplary embodiment of a data communicator for communicating a data stream through free space with differently polarized electromagnetic radiation over a free space channel.
Figure 3A:
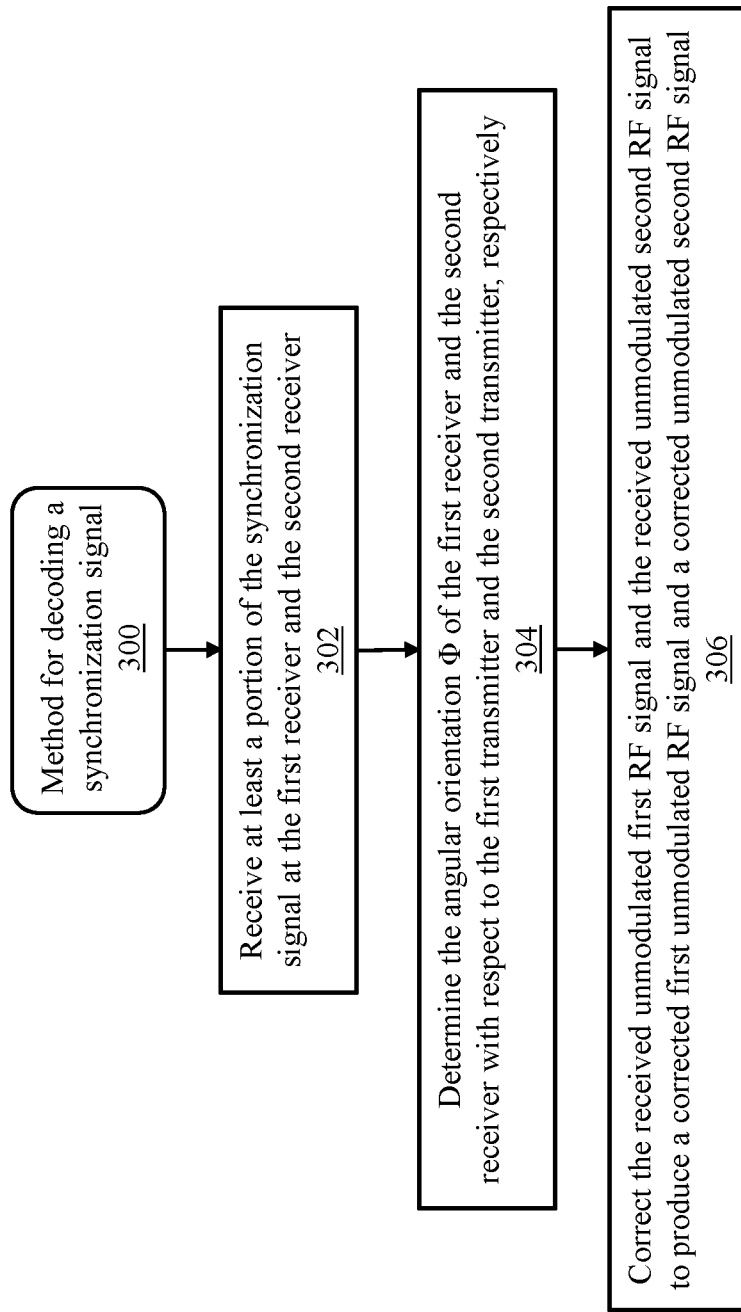
FIG. 3A illustrates a flow diagram for an exemplary method for decoding a synchronization signal.

FIG. 3A illustrates a flow diagram for an exemplary method 300 for decoding a synchronization signal in accordance with the present disclosure. In this example, the method 300 may utilize digital signal processing techniques to decode the synchronizing signal, and, as such, the portions of the synchronizing signal received by the first receiver 26 and the second receiver 28 may be digitized coherently with one another. Stated otherwise, the first receiver 26 and the second receiver 28 may utilize an analog-to-digital converter (ADC) to digitize the received portions of the synchronizing signal where the ADC of the first receiver 26 may be clocked simultaneously with the ADC of the second receiver 28 such that individual data samples may be paired. This may allow a voltage sample from the first receiver 26 to be taken at the same time as the corresponding sample from the second receiver 28 at any instant in time. Further, to decode the signal, an angular orientation θ of the first receiver 26 and the second receiver 28 may need to be determined as described below.

At 302, the method 300 may receive at least a portion of the synchronization signal (i.e., an unmodulated horizontally polarized free space RF reference signal at a maximum amplitude and a reference phase (i.e., a zero-degree phase)) at the first receiver 26 and the second receiver 28. While this example has described the second receiver 28 as receiving at least a portion of the synchronization signal, this is not always the case. If the first receiver 26 and the second receiver 28 are properly oriented with respect to the first transmitter 22 and the second transmitter 24, respectively, (i.e., the spatial polarization axes are aligned), only the first receiver 26 (e.g., the horizontally polarized receiver) may receive the synchronization signal to be output as a received first RF signal. If the spatial polarization axes of the first receiver 26 and the second receiver 28 are not properly oriented with respect to the first transmitter 22 and the second transmitter 24 (i.e., the spatial polarization axes are not aligned and the angle of rotation of the misalignment may be represented by the angular orientation φ), the first receiver 26 and the second receiver 28 may receive portions of the synchronization signal to be output as a received first RF signal and a received second RF signal.

At 304, the method 300 may determine the angular orientation θ of the first receiver 26 and the second receiver 28 with respect to the first transmitter 22 and the second transmitter 24, respectively. For example, the method 300 may detect, via an RF peak voltage detector, a peak voltage Vhpk of the received unmodulated first RF signal output by the first receiver 26 and a peak voltage Vvpk of the received unmodulated second RF signal output by the second receiver 28. If the peak voltages Vhpk and Vvpk are detected, the received modulated first RF signal 50 and the received modulated second RF signal 52 are not being transmitted, and the method 300 may enter a synchronization mode. The angular orientation θ may be determined according to the following equation:

$$\varphi = \mathrm{ARCTAN}\!\left(\frac{y}{x}\right) \qquad \text{Equation (1)}$$

Where y is the peak voltage Vvpk of the second receiver 28 and x is the peak voltage Vhpk of the first receiver 26.

At 306, the method 300 may correct the received unmodulated first RF signal and the received unmodulated second RF signal to produce a corrected first unmodulated RF signal and a corrected unmodulated second RF signal. The method 300 may accomplish this by determining polarization correction factors according to the following equations:

$$x' = x \cos \theta + y \sin \theta \qquad \text{Equation (3),}$$

and $$y' = -x(\sin \theta) + y \cos \theta \qquad \text{Equation (4)}$$

where x is the received unmodulated first RF signal, y is the is the received unmodulated second RF signal, x' is the corrected unmodulated first RF signal and y' is the corrected unmodulated second RF signal.

Figure 3B:
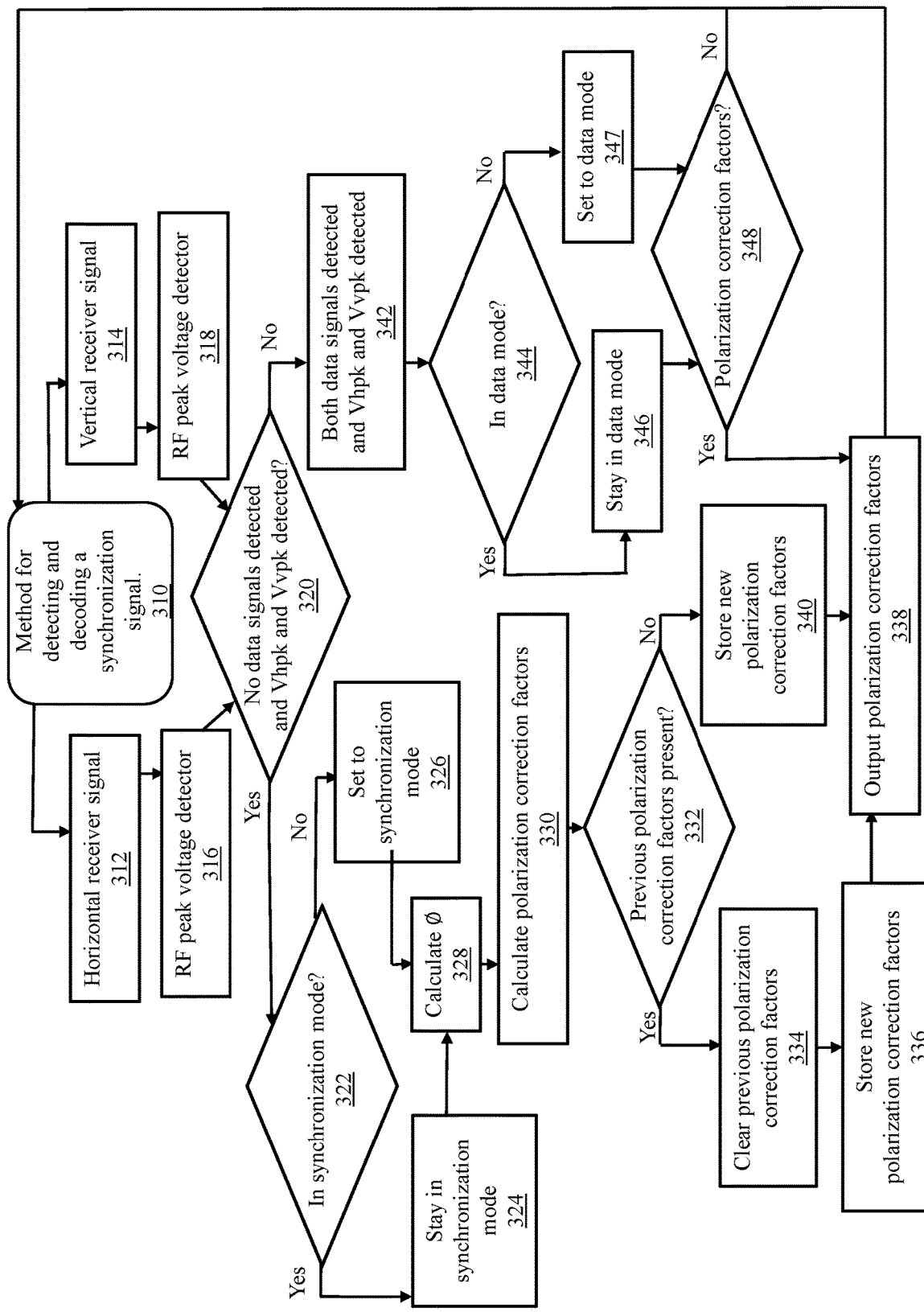
FIG. 3B illustrates a flow diagram for an exemplary method 310 for detecting and decoding a synchronization signal.

FIG. 3B illustrates a flow diagram for an exemplary method 310 for detecting and decoding a synchronization signal in accordance with the present disclosure. At 312, the method 310 may receive a horizontal receiver signal (e.g., a received unmodulated first RF signal including a portion of the synchronization signal). At 314, the method 310 may receive a vertical receiver signal (e.g., a received unmodulated second RF signal including a portion of the synchronization signal). At 316, the method 310 may detect, via an RF peak voltage detector, a peak voltage Vhpk of the horizontal receiver signal. At 318, the method 210 may detect, via the RF peak voltage detector, a peak voltage Vvpk of the vertical receiver signal. At 320, the method 310 may determine whether no data signals are present and whether both peak voltages Vhpk and Vvpk are detected. If yes at 320, at 322, the method 310 may determine whether the method 310 is currently in synchronization mode. If yes at 322, at 324, the method 310 may stay in synchronization mode. If no at 322, at 326, the method may enter synchronization mode. At 328, the method 310 may calculate the angular orientation θ of the first receiver and the second receiver. At 330, the method 310 may calculate the polarization correction factors according to the following equations:

$$Kx = \sin \theta \qquad \text{Equation (5),}$$

and $$Ky = \cos \theta \qquad \text{Equation (6)}$$

where Kx is a horizontal polarization correction factor, Ky is a vertical polarization correction factor, and θ is the respective angular orientation of the horizontally polarized receiver and the vertically polarized receiver, respectively.

At 332, the method 310 may determine whether previous polarization factors are being stored in a storage register. If yes at 332, at 334, the method 310 may clear the previous polarization correction factors from the storage register. At 336, the method 310 may store the new polarization correction factors. At 338, the method 310 may output the polarization correction factors. If no at 332, at 340, the method 310 may store the new polarization correction factors in the storage register and proceed to 338.

If no at 320, at 342, the method 310 may determine that both data signals are present and both Vhpk and Vvpk are present. At 344, the method 310 may determine whether the method 310 is currently in data mode. If yes at 344, at 346, the method 310 may stay in data mode. At 348, the method 310 may determine whether polarization factors are stored in the storage register. If yes at 348, the method 310 may proceed to 338.

If no at 344 (not yet in data mode), the method 310 may enter data mode at 347 and proceed to 348 to determine whether polarization factors are stored in the storage register. If no at 348, the method 310 may return to the beginning of the method 310 and the method 310 may be iterated as needed.

Figure 3C:
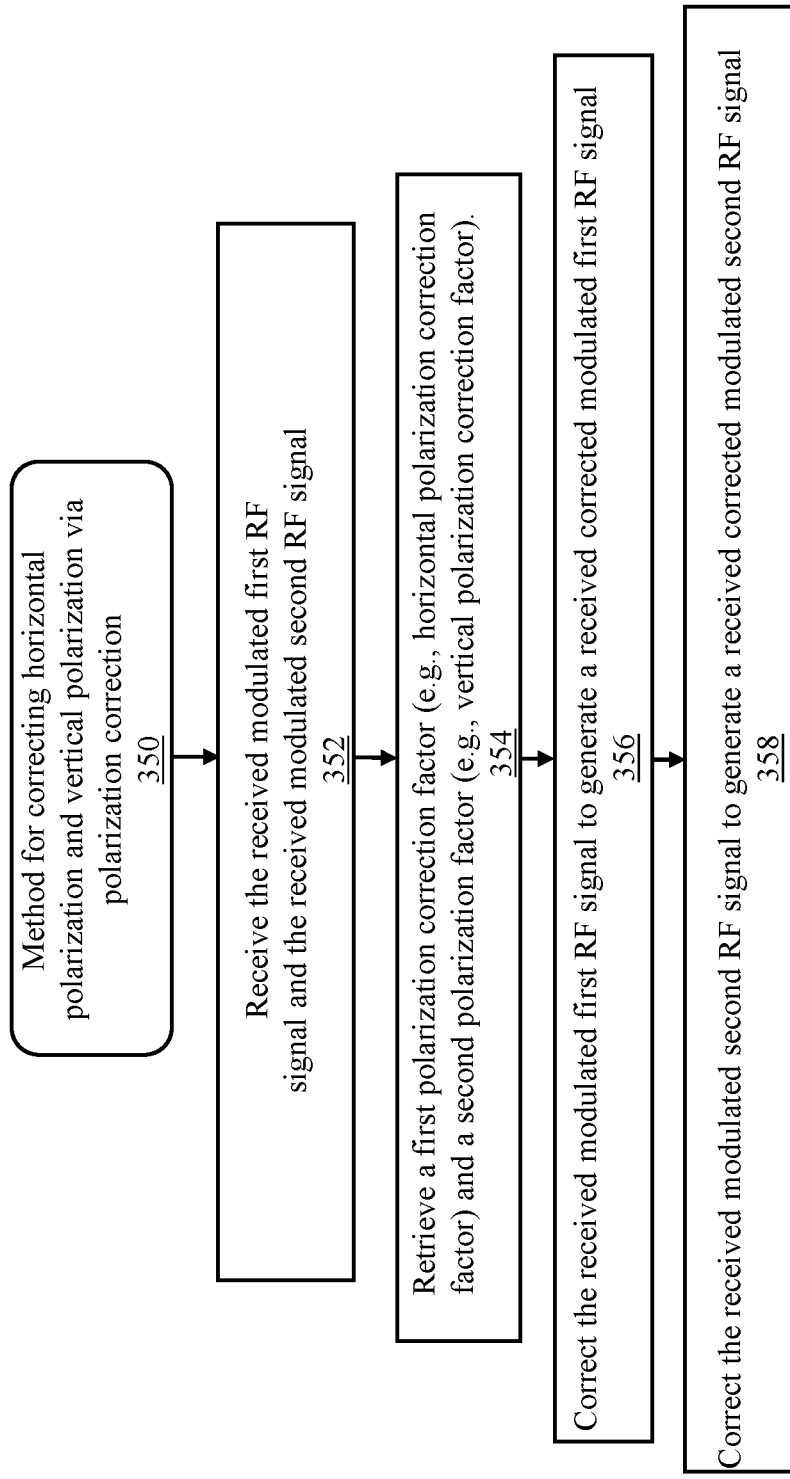
FIG. 3C illustrates a flow diagram of an exemplary method for correcting horizontal polarization and vertical polarization via polarization correction techniques.

FIG. 3C illustrates a flow diagram of an exemplary method 350 for correcting horizontal polarization and vertical polarization via polarization correction. At 352, the method 350 may receive the received modulated first RF signal (e.g., the signal received from the first receiver 26, which may be horizontally polarized) and the received modulated second RF signal (e.g., the signal received from the second receiver 28, which may be vertically polarized). At 354, the method 350 may retrieve a first polarization correction factor (e.g., a horizontal polarization correction factor) and a second polarization factor (e.g., a vertical polarization correction factor). At 356, the method 350 may generate a received corrected modulated first RF signal (e.g., the signal having horizontal polarization) according to the following equation:

$$Vh = (Vx \times Ky) + (Vy \times Kx) \qquad \text{Equation (7),}$$

where Vx is the received modulated first RF signal, Vy is the received modulated second RF signal, Kx is the horizontal polarization correction factor, and Ky is the vertical polarization correction factor. At 358, the method 350 may generate a received corrected modulated second RF signal (e.g., the signal having vertical polarization) according to the following equation:

$$Vv = (Vy \times Kx) - (Vx \times Ky) \qquad \text{Equation (8),}$$

where Vx is the received modulated first RF signal, Vy is the received modulated second RF signal, Kx is the horizontal polarization correction factor, and Ky is the vertical polarization correction factor.

The synchronization signal may be transmitted periodically such that the angular orientation θ of each of the first receiver 26 and the second receiver 28 with respect to the first transmitter 22 and the second transmitter 24 may be determined periodically. For example, the synchronization signal may be periodically transmitted such that the angular orientation θ of the first receiver 26 and the second receiver 28 with respect to the first transmitter 22 and the second transmitter 24 do not change significantly between synchronization signal transmissions.

To summarize, when a synchronization signal is received by the two receiving antennas 26 and 28, the angular orientation θ may be calculated, the polarization correction factors necessary to correct the two received unmodulated RF signals may be calculated and stored for polarization axis correction, and the polarization correction factors may be used to correct all subsequent received signals, extracting the originally transmitted horizontal and vertical signals. The corrected horizontal and vertical signals may then be fed to the demodulators. The polarization correction factors may be used repeatedly until the next synchronization signal is received and the synchronization process may be repeated.

In another example, a second synchronization signal (i.e., the unmodulated vertically polarized free space RF reference signal at a maximum amplitude and a reference phase (e.g., zero degrees)) may be transmitted immediately after the first synchronization signal (i.e., the unmodulated horizontally polarized free space RF reference signal at a maximum amplitude and a reference phase (e.g., zero degrees)). As such, there may be four transmitter states including a transmit data state, a transmit nothing state (e.g., no data transmission and no synchronization signal transmission), a transmit first synchronization signal state, and a transmit second synchronization signal state.

In another example, two unmodulated carrier signals may be transmitted for relatively short periods of time where one carrier signal may be horizontally polarized, and the other carrier signal may be vertically polarized. If the receivers are not aligned with the respective transmitters, each receiving antenna may intercept a portion of the horizontally polarized carrier signal and the vertically polarized carrier signal transmitted by the transmitting antennas.

For example, if one of the transmitting antennas transmits a horizontally polarized signal at full amplitude and reference phase as the first synchronization signal (e.g., a briefly transmitted synchronization signal), each of the receiving antennas may have an output. By selecting the receiving antenna having a greater amount of output as the receiving antenna to be used as the horizontally polarized receiving antenna, the output of the other receiving antenna may be regarded as an error signal. The error signal output by the other receiving antenna (i.e., the vertically polarized antenna) may be reduced to zero by multiplying an inverted portion of the signal output by the horizontally polarized receiving antenna by the error signal. Similarly, when the second synchronization signal (i.e., a vertically polarized signal at full amplitude and reference phase) is transmitted, the error signal associated with the horizontally polarized receiving antenna may be canceled out in a similar manner.

In this example, the axis rotation correction process may be performed often enough so that any movement of the transmitter antennas or the receiving antennas do not cause the received angle to change significantly while the error correction is being used.

To provide a computational example, a single horizontally polarized synchronization signal may be transmitted such that an amplitude of the signal received by the horizontally polarized receiver is 1 volt (i.e., 1=x=horizontal amplitude), an amplitude of the signal received by the vertically polarized receiver is 0 volts (i.e., 0=y=vertical amplitude). The transmission path loss is 0 decibels (dB). The expected horizontal antenna voltage is 0.866025 volts, the expected vertical antenna voltage is 0.5 volts, and the misalignment angle calculated from the antenna voltages is 30 degrees. The correction factors, calculated from the transmitted horizontally polarized synchronization signal, are 0.866025=Kx and 0.5=Ky. The corrected horizontal output voltage is 1 volt, and the corrected vertical antenna output voltage is 0.

In this example, the transmit data includes the following data: 0.5 volts=x=horizontal amplitude, 0.75 volts=y=vertical amplitude, a resulting vector magnitude=0.901388, and a resulting vector angle is 56.30993 degrees. The RF propagation through free space includes 0 dB transmission path loss and an antenna misalignment angle of 30 degrees. The orthogonal receivers include the following data: 0.058013=expected horizontal antenna voltage, 0.899519=expected vertical antenna voltage, 0.901388=received vector magnitude, and 86.30993=received vector angle calculated from the antenna voltages. The polarization correction factors include the following data: 0.866025=Kxh, 0.5=Kyh, 0.866025=Kxv, and 0.5=Kyv. The corrected horizontal antenna output voltage is 0.5 volts and the corrected vertical antenna output voltage is 0.75 volts.

To provide another computational example, a horizontally polarized synchronization signal and a vertically polarized synchronization signal may be transmitted. With respect to the horizontally polarized synchronization signal, an amplitude of the signal received by the horizontally polarized receiver is 1 volt (i.e., 1=x=horizontal amplitude), an amplitude of the signal received by the vertically polarized receiver is 0 volts (i.e., 0=y=vertical amplitude), a resulting vector magnitude is 1, and a resulting vector angle is 0 degrees. The transmission path loss is 0 decibels (dBs) and the axis orientation misalignment angle is 30 degrees. The expected horizontal antenna voltage is 0.866025 volts, the expected vertical antenna voltage is 0.5 volts, the received vector magnitude is 1, and the received vector angle calculated from the voltages is 30 degrees. The correction factors, calculated from the transmitted horizontally polarized synchronization signal, are 0.866025=Kxh and 0.5=Kyh.

With respect to the vertically polarized synchronization signal, an amplitude of the signal received by the horizontally polarized receiver is 0 volts (i.e., 0=x=horizontal amplitude), an amplitude of the signal received by the vertically polarized receiver is 1 volt (i.e., 1=y=vertical amplitude), a resulting vector magnitude is 1, and a resulting vector angle is 90 degrees. The transmission path loss is 0 decibels (dBs), and the axis orientation misalignment angle is 30 degrees. The expected horizontal antenna voltage is −0.5 volts, the expected vertical antenna voltage is 0.866025 volts, the received vector magnitude is 1, a received vector angle calculated from the antenna voltages is −60 degrees, and a received rotation angle corrected for the vertically polarized synchronization signal is 30 degrees. The correction factors, calculated from the transmitted vertically polarized synchronization signal, are 0.866025=Kxv and 0.5=Kyv.

In this example, the transmit data includes the following data: 0.5 volts=x=horizontal amplitude, 0.75 volts=y=vertical amplitude, a resulting vector magnitude=0.901388, and a resulting vector angle is 56.30993 degrees. The RF propagation through free space includes 0 dB transmission path loss and an antenna misalignment angle of 30 degrees. The orthogonal receivers include the following data: 0.058013=expected horizontal antenna voltage, 0.899519=received vector magnitude, and 86.3099=received vector angle calculated from the antenna voltages. The polarization correction factors include the following data: 0.866025=Kxh, 0.5=Kyh, 0.866025=Kxv, and 0.5=Kyv. The corrected horizontal antenna output voltage is 0.5 volts and the corrected vertical antenna output voltage is 0.75 volts.

While exemplary methods of synchronization have been described, any suitable method of method of synchronization may be utilized including asynchronous and synchronous synchronization techniques.

After the received modulated first RF signal 50 and the received modulated second RF signal 52 are corrected to produce the corrected modulated first RF signal 64 and the corrected modulated second RF signal 66, the demodulator 30 may demodulate the corrected modulated first RF signal 64 and the corrected modulated second RF signal 66 to extract the first portion of data of the data stream from the corrected modulated first RF signal 64 and the second portion of data of the data stream from the corrected modulated second RF signal 66.

The demodulator 30 may include a combiner 30a that combines the first portion of data of the data stream extracted from the corrected modulated first RF signal 64 and the second portion of the data of the data stream extracted from the corrected modulated second RF signal 66 to output a data stream 54 containing the data that was contained in data stream 34. The output data stream 54 may be fed as an input to the output source 32.

As such, one additional exemplary benefit of the data communicator 200 is the ability to correct for misalignment between the polarizations of the transmitters (e.g., 22 and 24) and the receivers (e.g., 26 and 28) of the data communicator 200.

FIG. 3 illustrates a block diagram of another exemplary embodiment of a data communicator 300 for communicating a data stream through free space with differently polarized electromagnetic radiation over a free space channel. The data communicator 300 of FIG. 3 is substantially identical to the data communicator 200 of FIG. 2, with a few exceptions/changes as described further below.

More particularly, the data source 12 and the output source 32 may be data registers and the first modulator 18 and the second modulator 20 of the data communicator 300 may be 16-state quadrature amplitude modulators, which may also be referred to as 16-QAMs. The 16-QAMs 18 and 20 may modulate two different carrier signals into the same bandwidth by generating an amplitude modulated signal based on two carrier signals having the same frequency and a phase difference of ninety degrees. Typically, a cosine carrier signal is referred to as an in-phase component while a sine carrier signal is referred to as a quadrature component. With 16-QAMs, four bits of data may be modulated onto the amplitude modulated carrier and may be represented as one of 16 possible states.

As such, the data communicator 300 may include a phase shift network 68 configured to phase shift the first RF carrier signal 40a and the second RF carrier signal 40b such that they are in a quadrature relationship with one another (e.g., the first RF carrier signal 40a may have a phase shift of zero degrees and the second RF carrier signal 40b may have has a phase shift of ninety degrees) to be fed as inputs to the first modulator 18 and the second modulator 20.

On the receiving side of the data communicator 300, the demodulator 30 of the data communicator 300 may utilize quadrature amplitude demodulation techniques. The data communicator 300 may further include a second demodulator 70 that may also utilize quadrature amplitude demodulation techniques. The receiving side may further include a signal generator 72 and a phase shift network 74.

The data communicator 300 of FIG. 3 may operate substantially similar to the data communicator 10 of FIG. 1 in combination with the data communicator 200 of FIG. 2, with a few exceptions/changes as further described below.

In the example of FIG. 3, the data stream may be a data byte, which contains 8 bits. The data source 12 may provide the data stream (i.e., the data byte) having a first bandwidth to the data separator 14. The data separator 14 may separate the input signal 34 into a first signal 36 carrying a first portion of data of the data stream having a second bandwidth and a second signal 38 carrying a second portion of data of the data stream having a third bandwidth. In this example, the first portion of data of the data stream and the second portion of data of the data stream may each contain 4 bits of the data byte. The first bandwidth of the input signal 34 may be greater than each of the second bandwidth of the first signal 36 and the third bandwidth of the second signal 38.

In this example, the signal generator 16 may generate a reference carrier signal 39 that may be fed as an input to the phase shift network 68. The phase shift network 68 may output the first RF carrier signal 40a and the second RF carrier signal 40b, and, in this example, the first RF carrier signal 40a and the second RF carrier signal 40b may be in a quadrature relationship to one another. The first RF carrier signal 40a and the second RF carrier signal 40b may each be fed as inputs to the first modulator 18 and the second modulator 20. The first modulator 18 may modulate the first signal 36 onto the first RF carrier signal 40a and the second RF carrier signal 40b and may output a modulated first RF signal 44. The second modulator 20 may modulate the second signal 38 onto the first RF carrier signal 40a and the second RF carrier signal 40b and may output a modulated second RF signal 46.

The modulated first RF signal 44 may be fed as an input to an amplifier 76 to be amplified, if necessary. After leaving the amplifier 76, the modulated first RF signal 44 may be fed as an input to the first transmitter 22. The modulated second RF signal 46 may be fed as an input to an amplifier 78 to be amplified, if necessary. After leaving the amplifier 78, the modulated second RF signal 46 may be fed as an input to the second transmitter 24.

The first transmitter 24 may transmit the modulated first RF signal 44 with a first polarization over a free space channel 48. The second transmitter 24 may transmit the modulated second RF signal 46 with a second polarization that is different than the first polarization over the free space channel 48. In some implementations, the first polarization may be horizontal, and the second polarization may be vertical, however, the first polarization and the second polarization may be any suitable polarizations.

The first receiver 26 may receive the transmitted modulated first RF signal 44 having the first polarization and may output a received modulated first RF signal 50. The second receiver 28 may receive the transmitted modulated second RF signal 46 having the second polarization and may output a received modulated second RF signal 52. In some implementations, the first receiver 26 may be horizontally polarized and the second receiver 28 may be vertically polarized, however, the first receiver 26 and the second receiver 28 may be polarized in any suitable manner.

The received modulated first RF signal 50 may be fed as an input to an amplifier 80 to be amplified, if necessary. Likewise, the received modulated second RF signal 52 may be fed to an amplifier 82 to be amplified, if necessary. After the received modulated first RF signal 50 leaves the amplifier 80, and after the received modulated second RF signal 52 leaves the amplifier 82, the received modulated first RF signal 50 and the received modulated second RF signal 52 may be processed without corrections.

Stated otherwise, if the polarization of the first transmitter 22 matches the polarization of the first receiver 26 and the polarization of the second transmitter 24 matches the polarization of the second receiver 28, no corrections may need to be made to the received modulated first RF signal 50 and the received modulated second RF signal 52 before being fed as inputs to the demodulator 30.

In contrast, if the polarization of the first transmitter 22 does not match the polarization of the first receiver 26 and/or the polarization of the second transmitter 24 does not match the polarization of the second receiver 28, corrections may need to be made to the received modulated first RF signal 50 and the received modulated second RF signal 52 before being fed as inputs to the demodulator 30.

For exemplary purposes, in the example of FIG. 3, it is to be assumed that the polarization of the first transmitter 22 does not match the polarization of the first receiver 26, and the polarization of the second transmitter 24 does not match the polarization of the second receiver 28. In this case, the received modulated first RF signal 50 and the received modulated second RF signal 52 may need to be corrected, via the first polarization corrector 60 and the second polarization corrector 62, such that a corrected modulated first RF signal 64 and a corrected modulated second RF signal 66 may each represent only one, or substantially only one, type of polarization before being fed as inputs to the demodulator 30 and the second demodulator 70.

With continued reference to FIG. 3, the signal generator 72, which may be synchronized and phase locked with the signal generator 16 on the transmitter side of the data communicator 300, may generate a reference carrier signal 73 that may be fed as an input to the phase shift network 74. The phase shift network 74 may output a demodulating first RF carrier signal 84 and a demodulating second RF carrier signal 85, and, in this example, the demodulating first RF carrier signal 84 and the demodulating second RF carrier signal 85 may be in a quadrature relationship to one another.

The demodulating first RF carrier signal 84, the demodulating second RF carrier signal 85, and the corrected modulated first RF signal 64 may each be fed as inputs to the demodulator 30. The demodulator 30 may use the demodulating first RF signal 84 and the demodulating second RF carrier signal 85 to demodulate the corrected modulated first RF signal 64 to extract the first portion of data of the data stream (i.e., 4 bits) from the corrected modulated first RF signal 64.

The demodulating first RF carrier signal 84, the demodulating second RF carrier signal 85, and the corrected modulated second RF signal 64 may each be fed as inputs to the second demodulator 70. The second demodulator 70 may use the demodulating first RF signal 84 and the demodulating second RF carrier signal 85 to demodulate the corrected modulated second RF signal 66 to extract the second portion of data of the data stream (i.e., 4 bits) from the corrected modulated second RF signal 66. The demodulator 30 may output a data stream 86 containing the first portion of data of the data stream, which may be fed as an input to the output source 32. The second demodulator 70 may output a data stream 88 containing the second portion of data of the data stream, which may be fed as an input to the output source 32.

While the examples in FIG. 1, FIG. 2, and FIG. 3 were directed primarily to analog circuitry, an example provided below may incorporate digital signal processing techniques.

Figure 4:
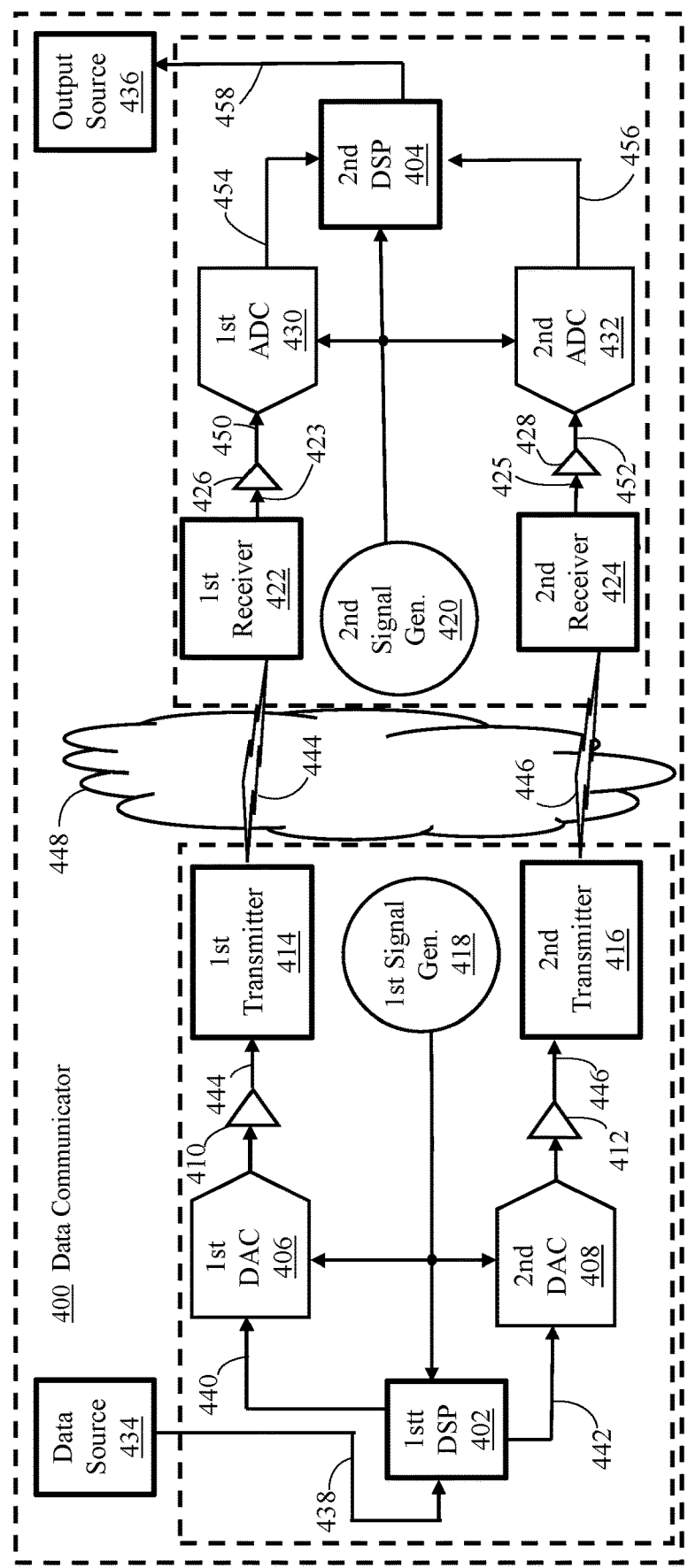
FIG. 4 illustrates a block diagram of another exemplary embodiment of a data communicator for communicating a data stream through free space with differently polarized electromagnetic radiation over a free space channel.

FIG. 4 illustrates a block diagram of another exemplary embodiment of a data communicator 400 for communicating a data stream through free space with differently polarized electromagnetic radiation over a free space channel. The data communicator 400 may include a first digital signal processor (DSP) 402, a second DSP 404, a first digital-to-analog converter (DAC) 406, a second DAC 408, a first amplifier 410, a second amplifier 412, a first transmitter 414, a second transmitter 416, a first signal generator 418, a second signal generator 420, a first receiver 422, a second receiver 424, a third amplifier 426, a fourth amplifier 428, a first ADC 430, a second ADC 432, a data source 434, and an output source 436.

The data source 434 may provide a data stream 438 (e.g., a byte) to the first DSP 402. The first DSP 402 may process the data stream 438 to generate a first digital data stream 440 and a second digital data stream 442. The first digital data stream 440 may be fed as an input to the first DAC 406, and the second digital data stream 442 may be fed as an input to the second DAC 408. The first DAC 406 may convert the first digital data stream 440 into a modulated first RF signal 444 and the second DAC 408 may convert the second digital data stream 442 to a modulated second RF signal 446.

The modulated first RF signal 444 may be fed as an input to the first amplifier 410 to be amplified, if necessary. The modulated second RF signal 446 may be fed as an input to the second amplifier 412 to be amplified, if necessary.

The modulated first RF signal 444 may be fed as an input to the first transmitter 414 and the modulated second RF signal 446 may be fed as an input to the second transmitter 416. The first transmitter 414 may transmit the modulated first RF signal 444 with a first polarization over a free space channel 448. The second transmitter 416 may transmit the modulated second RF signal 446 with a second polarization that is different than the first polarization through the free space channel 448. In some implementations, the first polarization may be horizontal, and the second polarization may be vertical, however, the first polarization and the second polarization may be any suitable polarizations.

The first receiver 422 may receive the transmitted modulated first RF signal 444 having the first polarization and may output a received modulated first RF signal 450. The second receiver 424 may receive the transmitted modulated second RF signal 446 having the second polarization and may output a received modulated second RF signal 452. In some implementations, the first receiver 422 may be horizontally polarized and the second receiver 424 may be vertically polarized, however, the first receiver 422 and the second receiver 424 may be polarized in any suitable manner.

The received modulated first RF signal 423 may be fed as an input to the third amplifier 426 to be amplified, if necessary. The output 450 of the amplifier 426 drives the first ADC 430. The received modulated second RF signal 425 may be fed as an input to the fourth amplifier 428 to be amplified, if necessary. The output 452 of the amplifier 428 drives the second ADC 432.

The first ADC 430 may digitize the amplified modulated first RF signal 450 to generate first digital output data 454. The second ADC 432 may digitize the amplified modulated second RF signal 452 to generate second digital output data 456.

The second signal generator 420 may provide clocking signals to the first ADC 430, the second ADC 432, and the second DSP 404. The first digital output data 454 and the second digital output data 456 may be fed as inputs to a receive side of the second DSP 404. The second DSP 404 may demodulate the first digital output data 454 and the second digital output data 456 and may output an output data stream 458 to be fed as an input to the output source 436. A received data output register on the receive side of the second DSP 404 may be updated with the received first digital data output 454 and the second digital data output 456 at a rate associated with a symbol clock.

In the event an allocated RF channel used is at a frequency higher than the capabilities of either the analog system (e.g., the examples of FIG. 1, FIG. 2, and FIG. 3) or the DSP system (e.g., the example of FIG. 4), an upconverter (not shown) may be utilized on the transmit side before the signals are transmitted and a downconverter may be utilized on the receive side after the signals have been received to allow signal processing operations of the data communicators 10, 200, 300, and 400 to occur at a lower frequency, which also may ease circuit design requirements.

While some of the examples have described using 16-QAM modulation and its associated demodulation techniques, it is to be understood that the modulation/demodulation techniques associated with the present application are not limited to 16-QAM, and any suitable modulation/demodulation techniques may be utilized. It should be noted that while the present disclosure has described polarizations as being horizontal and vertical relative to one another, it is to be understood that any suitable polarizations may be utilized, such as, for example any two polarizations that are orthogonal to one another.

Figure 5:
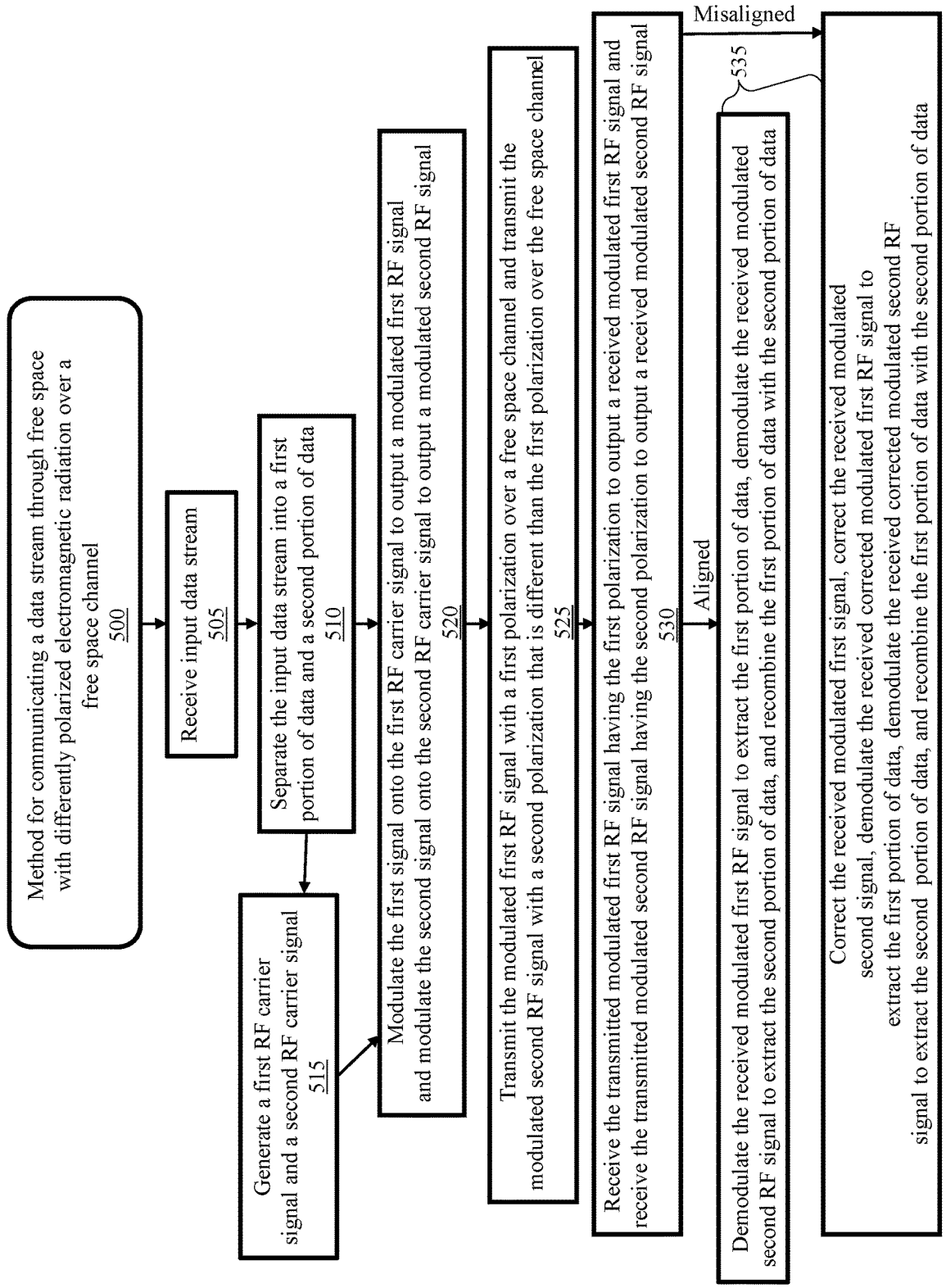
FIG. 5 illustrates a flow diagram for an exemplary method for communicating a data stream through free space with differently polarized electromagnetic radiation over a free space channel.

FIG. 5 illustrates a flow diagram for an exemplary method 500 for communicating a data stream through free space with differently polarized electromagnetic radiation over a free space channel. At 505, the method 500 may include receiving input data stream having a first bandwidth. At 510, the method 500 may separate the input data stream into a first signal carrying a first portion of data of the data stream having a second bandwidth and a second signal carrying a second portion of data of the data stream having a third bandwidth. The first bandwidth of the input signal may be greater than each of the second bandwidth of the first signal and the third bandwidth of the second signal. In some implementations, the first portion of data of the data stream may be an initial portion and the second portion of data of the data stream may be a remaining portion such that the entire data stream is communicated by, at least in part, the first signal and the second signal.

At 515, the method 500 may include generating a first RF carrier signal and a second RF carrier signal. At 520, the method 500 may include modulating the first signal onto the first RF carrier signal to output a modulated first RF signal and modulating the second signal onto the second RF carrier signal to output a modulated second RF signal.

At 525, the method 500 may include transmitting the modulated first RF signal with a first polarization over a free space channel and transmitting the modulated second RF signal with a second polarization that is different than the first polarization through the free space channel. In some implementations, the first polarization may be horizontal, and the second polarization may be vertical, however, the first polarization and the second polarization may be any suitable polarizations.

At 530, the method 500 may include receiving the transmitted modulated first RF signal having the first polarization to output a received modulated first RF signal and receiving the transmitted modulated second RF signal having the second polarization to output a received modulated second RF signal. In some implementations, the receivers may be polarized horizontally and/or vertically polarized.

At 535, the method 500 may branch into two paths as follows: if the polarization of the transmitters and receivers utilized by the method 500 match (e.g., are aligned), the method 500 may include demodulating the received modulated first RF signal and demodulating the received modulated second RF signal to extract the first portion of data of the data stream from the received modulated first RF signal and the second portion of the data of the data stream from the received modulated second RF signal to be recombined; and, if the polarization of the transmitters and receivers utilized by the method 500 do not match (e.g., are misaligned), the method 500 may include correcting the received modulated first RF signal via a first polarization corrector and correcting the received modulated second RF signal via a second polarization corrector via one or more synchronization signals and demodulating the corrected modulated first RF signal and/or the corrected modulated second RF signal to extract the first portion of data of the data stream from the corrected modulated first RF signal and the second portion of data of the data stream from the transformed modulated second RF signal to be recombined.

It is to be understood that the method 500 may be modified to include other analog and/or digital signal processing techniques, such as, for example, QAM processing techniques other than 16-QAM processing techniques. To accomplish this, the method 500 may include, on the transmit side, generating and/or phase shifting two carrier signals to be fed to two separate QAMs and modulating the signals carrying the portions of data of the data stream onto the carrier signals of the QAMs to be transmitted, and, on the receive side, generating and/or phase shifting two demodulating RF signals, synchronized with transmit side, to be fed to two separate demodulating QAMs, and demodulating the signals to extract the portions of data of the data stream from the signals to be recombined.

While FIGS. 3A, 3B, 3C, and 5 illustrate various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed and that lightweight processes, regular processes, threads, and other approaches could be employed. It is to be appreciated that other example methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an example methodology. Furthermore, additional methodologies, alternative methodologies, or both can employ additional blocks, not illustrated.

In the flow diagram, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

Figure 6:
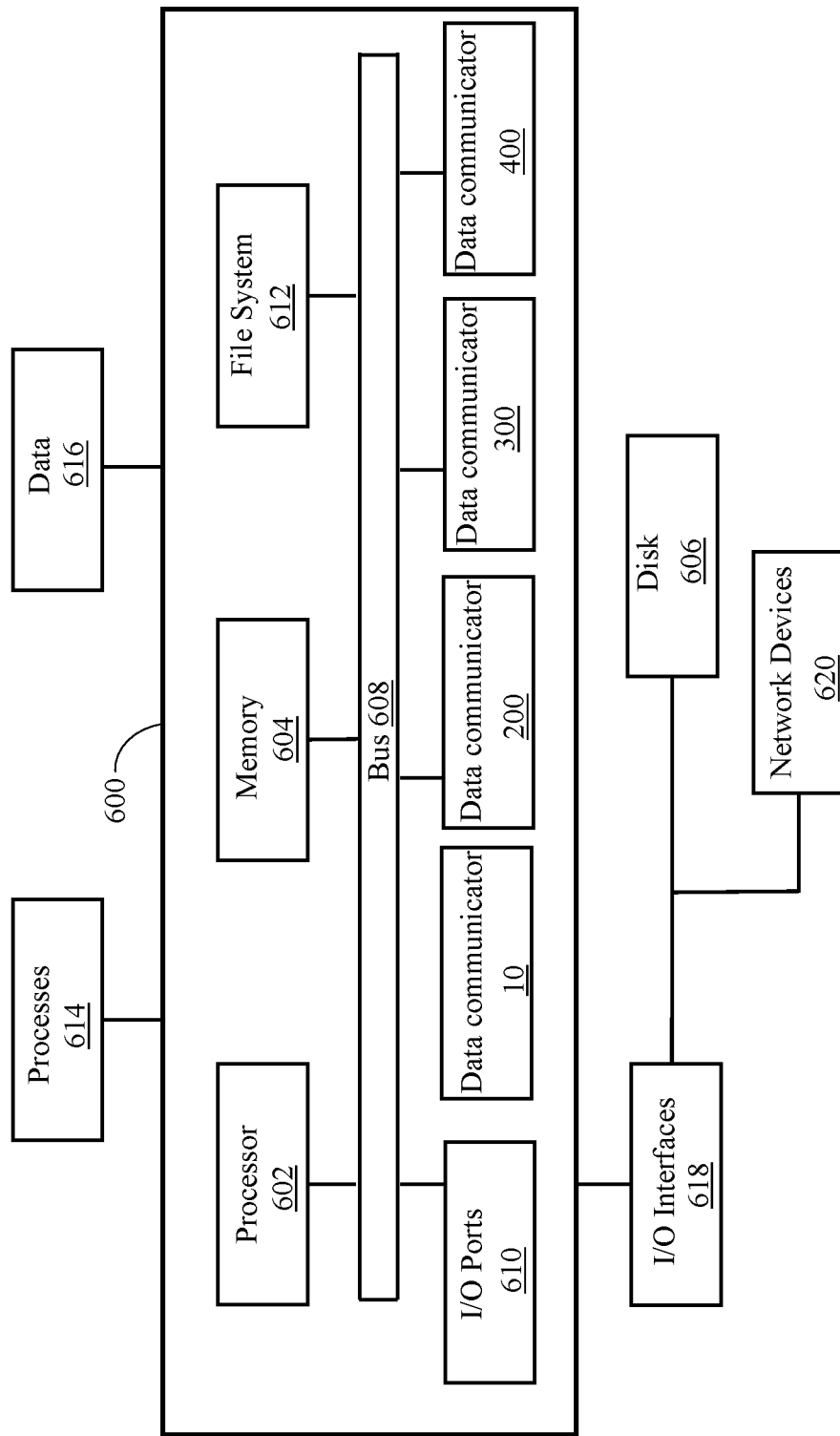
FIG. 6 illustrates a block diagram of an exemplary machine for communicating a data stream through free space with differently polarized electromagnetic radiation.

FIG. 6 illustrates a block diagram of an exemplary machine 600 for communicating a data stream through free space with differently polarized electromagnetic radiation over a free space channel. The machine 600 includes a processor 602, a memory 604, I/O Ports 610, and a file system 612 operably connected by a bus 608.

In one example, the machine 600 may transmit input and output signals described above via, for example, I/O Ports 610 or I/O Interfaces 618. The machine 600 may also include the data communicators 10, 200, 300, and 400, and all of their associated components. Thus, data communicators 10, 200, 300, and 400, and their associated components may be implemented in machine 600 as hardware, firmware, software, or combinations thereof and, thus, the machine 600 and its components may provide means for performing functions described herein as performed by the data communicators 10, 200, 300, and 400 and their associated components.

The processor 602 can be a variety of various processors including dual microprocessor and other multi-processor architectures. The memory 604 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the machine 600 via, for example, an I/O Interface (e.g., card, device) 618 and an I/O Port 610. The disk 606 can include, but is not limited to, devices like a magnetic disk drive, a solid-state disk drive, a floppy disk drive, a tape drive, a Zip drive, a flash memory card, or a memory stick. Furthermore, the disk 406 can include optical drives like a CD-ROM, a CD recordable drive (CD-R drive), a CD rewriteable drive (CD-RW drive), or a digital video ROM drive (DVD ROM). The memory 604 can store processes 614 or data 616, for example. The disk 606 or memory 604 can store an operating system that controls and allocates resources of the machine 600.

The bus 608 can be a single internal bus interconnect architecture or other bus or mesh architectures. While a single bus is illustrated, it is to be appreciated that machine 600 may communicate with various devices, logics, and peripherals using other busses that are not illustrated (e.g., PCIE, SATA, Infiniband, 1394, USB, Ethernet). The bus 608 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The machine 600 may interact with input/output devices via I/O Interfaces 618 and I/O Ports 610. Input/output devices can include, but are not limited to, a keyboard, a microphone, a pointing and selection device, cameras, video cards, displays, disk 606, network devices 620, and the like. The I/O Ports 610 can include but are not limited to, serial ports, parallel ports, and USB ports.

The machine 600 can operate in a network environment and thus may be connected to network devices 620 via the I/O Interfaces 618, or the I/O Ports 610. Through the network devices 620, the machine 600 may interact with a network. Through the network, the machine 600 may be logically connected to remote devices. The networks with which the machine 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 620 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

While example systems, methods, and so on, have been illustrated by describing examples, and while the examples have been described in considerable detail, it is not the intention of the applicant to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A machine or group of machines for transmitting information, comprising:
    a signal generator configured to generate a first carrier signal and a second carrier signal;
    a signal source configured to provide a data signal carrying data;
    a data separator configured to separate the data signal into a first signal and a second signal such that the first signal includes a first portion of the data of the data signal and the second signal includes a second portion of the data of the data signal;
    one or more modulators configured to:
        modulate the first carrier signal with the first signal to produce a modulated first signal; and
        modulate the second carrier signal with the second signal to produce a modulated second signal;
    a synchronization signal controller configured to generate a synchronization signal;
    one or more transmitters configured to:
        radiate the modulated first signal with a first polarization as a polarized first signal over a free space channel; and
        radiate the modulated second signal with a second polarization as a polarized second signal through the free space channel; wherein the first polarization is different than the second polarization; and wherein the synchronization signal is a reference signal that indicates whether the polarized first signal is polarized with the first polarization as radiated by the one or more transmitters and whether the polarized second signal is polarized with the second polarization as radiated by the one or more transmitters.

2. The machine or group of machines of claim 1, wherein the first polarization and the second polarization are orthogonal to one another.

3. The machine or group of machines of claim 1, wherein the first portion of the data of the data signal and the second portion of the data of the data signal are an entirety of the data of the data signal.

4. The machine or group of machines of claim 1, further comprising:
   a phase shift network configured to phase shift the first carrier signal and the second carrier signal such that the first carrier signal and the second carrier signal are in a quadrature relationship to one another.

5. The machine or group of machines of claim 1, wherein the one or more modulators utilize quadrature amplitude modulation techniques.

6. The machine or group of machines of claim 1, wherein the modulated first signal and the modulated second signal are radiated in a single radio frequency spectrum.

7. The machine or group of machines of claim 1, wherein the data signal has a first bandwidth, the modulated first signal has a second bandwidth, and the modulated second signal has a third bandwidth; wherein the second bandwidth is less than the first bandwidth; and wherein the third bandwidth is less than the first bandwidth.

8. A machine or group of machines for receiving information, comprising:
   one or more receivers configured to receive a polarized first signal and a polarized second signal; wherein each of the polarized first signal and the polarized second signal include a first signal portion and a second signal portion; wherein the first signal portion of the polarized first signal and the second signal portion of the polarized second signal are polarized with a first polarization and the second signal portion of the polarized first signal and the first signal portion of the polarized second signal are polarized with a second polarization different from the first polarization; wherein the first signal portion of the polarized first signal and the second signal portion of the polarized second signal communicate a first portion of data of a data signal; wherein the second signal portion of the polarized first signal and the first signal portion of the polarized second signal communicate a second portion of the data of the data signal;
   a synchronization signal decoder configured to receive the polarized first signal, the polarized second signal, and a synchronization signal; wherein the synchronization signal decoder is further configured to determine polarization of the polarized first signal and the polarized second signal;
   one or more polarization correctors configured to correct the polarized first signal and the polarized second into a corrected polarized first signal and a corrected polarized second signal; wherein the corrected polarized first signal includes the first signal portion of the polarized first signal and at least a part of the second signal portion of the polarized second signal; and wherein the corrected polarized second signal includes at least a part of the second signal portion of the polarized first signal and the first signal portion of the polarized second signal;
   one or more demodulators configured to:
      demodulate the corrected polarized first signal to provide a demodulated first signal; wherein the demodulated first signal carries the first portion of the data of the data signal; and
      demodulate the corrected polarized second signal to provide a demodulated second signal; wherein the demodulated second signal carries the second portion of the data of the data signal; and
   a combiner configured to combine the demodulated first signal with the demodulated second signal to provide an output signal; wherein the output signal carries the data of the data signal.

9. The machine or group of machines of claim 8, wherein the first polarization and the second polarization are orthogonal to one another.

10. The machine or group of machines of claim 8, wherein the synchronization signal is received by the one or more receivers before the polarized first signal and the polarized second signal are received by the one or more receivers.

11. The machine or group of machines of claim 8, wherein the synchronization signal is a synchronous synchronization signal.

12. The machine or group of machines of claim 8, wherein the synchronization signal is an asynchronous synchronization signal.

13. The machine or group of machines of claim 8, wherein the polarized first signal and the polarized second signal are stored by the one or more polarization correctors after being received by the one or more receivers; wherein the synchronization signal decoder is further configured to determine polarization correction factors associated with the polarized first signal and the polarized second signal based, at least in part, on the synchronization signal; and wherein the one or more polarization correction factors are configured to correct the polarized first signal and the polarized second signal based, at least in part, on the polarization correction factors into the corrected polarized first signal and the corrected polarized second signal.

14. The machine or group of machines of claim 13, wherein subsequent synchronization signals are periodically received by the synchronization signal decoder.

15. The machine or group of machines of claim 8, wherein the at least the part of the second signal portion of the polarized second signal is an entirety of the second signal portion of the polarized second signal.

16. The machine of claim 8, wherein the at least the part of the first signal portion of the polarized first signal is an entirety of the first signal portion of the polarized first signal.

17. The machine or group of machines of claim 8, wherein the first portion of the data of the data signal and the second portion of the data of the data signal are an entirety of the data of the data signal.

18. The machine or group of machines of claim 8, wherein the polarized first signal and the polarized second signal are quadrature signals; the machine or group of machines further comprising:
   a signal generator configured to generate a first demodulating signal and a second demodulating signal; and
   a phase shift network configured to phase shift the first demodulating signal and the second demodulating signal such that the first demodulating signal and the second demodulating signal are in a quadrature relationship to one another; wherein the first demodulating signal and the second demodulating signal are fed to the one or more demodulators to demodulate the corrected polarized first signal and the corrected polarized second signal.

19. The machine or group of machines of claim 8, wherein the polarized first signal and the polarized second signal are received from a single radio frequency spectrum.

20. The machine or group of machines of claim 8, wherein, before being received by the one or more receivers, the first signal portion of the polarized first signal and the second signal portion of the polarized first signal are polarized with the first polarization and the first signal portion of the polarized second signal and the second signal portion of the polarized second signal are polarized with the second polarization.

21. A method for transmitting information, the method comprising:
generating a first carrier signal and a second carrier signal;
receiving a data signal including data;
separating the data signal into a first signal and a second signal such that the first signal includes a first portion of the data of the data signal and the second signal includes a second portion of the data of the data signal;
modulating the first carrier signal with the first signal to provide a modulated first signal;
modulating the second carrier signal with the second signal to provide a modulated second signal;
generating a synchronization signal;
radiating the modulated first signal with a first polarization as a polarized first signal over a free space channel;
radiating the modulated second signal with a second polarization as a polarized second signal over the free space channel; wherein the first polarization is different than the second polarization; and wherein the synchronization signal indicates whether the polarized first signal is polarized with the first polarization as initially radiated over the free space channel and whether the polarized second signal is polarized with the second polarization as initially radiated over the free space channel.

22. The method of claim 21, wherein the first polarization and the second polarization are orthogonal to one another.

23. The method of claim 21, wherein the first portion of the data of the data signal and the second portion of the data of the data signal are an entirety of the data of the data signal.

24. The method of claim 21, further comprising:
phase shifting at least one of the first carrier signal and the second carrier signal such that the first carrier signal and the second carrier signal are in a quadrature relationship to one another.

25. The method of claim 24, further comprising:
utilizing quadrature amplitude modulation techniques to modulate the first carrier signal with the first signal and the second carrier signal with the second signal; and
utilizing quadrature amplitude demodulation techniques to demodulate the polarized first signal and the polarized second signal.

26. The method of claim 21, wherein the modulated first signal and the modulated second signal are radiated in a single radio frequency spectrum.

27. The method of claim 21, wherein the data signal has a first bandwidth, the modulated first signal has a second bandwidth, and the modulated second signal has a third bandwidth; wherein the second bandwidth is less than the first bandwidth; and wherein the third bandwidth is less than the first bandwidth.

28. A method for receiving information, the method comprising:
receiving a polarized first signal including a first signal portion and a second signal portion;
receiving a polarized second signal including a first signal portion and a second signal portion; wherein the first signal portion of the polarized first signal and the second signal portion of the polarized second signal are polarized with a first polarization and the second signal portion of the polarized first signal and the first signal portion of the polarized second signal are polarized with a second polarization different than the first polarization; wherein the first signal portion of the polarized first signal and the second signal portion of the polarized second signal communicate a first portion of data of a data signal; wherein the second signal portion of the polarized first signal and the first signal portion of the polarized second signal communicate a second portion of the data of the data signal;
receiving a synchronization signal;
extracting polarization information of the polarized first signal and the polarized second signal based on the synchronization signal; correcting the polarized first signal and the polarized second signal based, at least in part, on the polarization information into a corrected first signal and a corrected second signal; wherein the corrected first signal includes the first signal portion of the polarized first signal and at least a part of the second signal portion of the polarized second signal; wherein the corrected second signal includes at least a part of the second signal portion of the polarized first signal and the first signal portion of the polarized second signal;
demodulating the corrected first signal to provide a demodulated first signal; wherein the demodulated first signal carries the first portion of the data of the data signal; and
demodulating the corrected second signal to provide a demodulated second signal; wherein the demodulated second signal carries the second portion of the data of the data signal; and
combining the demodulated first signal with the demodulated second signal to provide an output signal; wherein the output signal carries the data of the data signal.

29. The method of claim 28, wherein the first polarization and the second polarization are orthogonal to one another.

30. The method of claim 28, further comprising:
receiving the synchronization signal before receiving the polarized first signal and the polarized second signal.

31. The method of claim 28, wherein the synchronization signal is a synchronous synchronization signal.

32. The method of claim 28, wherein the synchronization signal is an asynchronous synchronization signal.

33. The method of claim 28, further comprising:
determining polarization correction factors associated with the polarized first signal and the polarized second signal based, at least in part, on the synchronization signal;
storing the polarization correction factors; and
correcting the polarized first signal and the polarized second signal based, at least in part, on the polarization correction factors into the corrected polarized first signal and the corrected polarized second signal.

34. The method of claim 33, further comprising:
periodically receiving subsequent synchronization signals.

35. The method of claim 28, wherein the at least the part of the second signal portion of the polarized second signal is an entirety of the second signal portion of the polarized second signal.

36. The method of claim 28, wherein the at least the part of the second signal portion of the polarized first signal is an entirety of the first signal portion of the polarized first signal.

37. The method of claim 28, wherein the first portion of the data of the data signal and the second portion of the data of the data signal are an entirety of the data of the data signal.

* * * * *